July 14, 1942.     O. C. PILLAR     2,289,994
PISTON
Filed Oct. 22, 1941     2 Sheets-Sheet 1
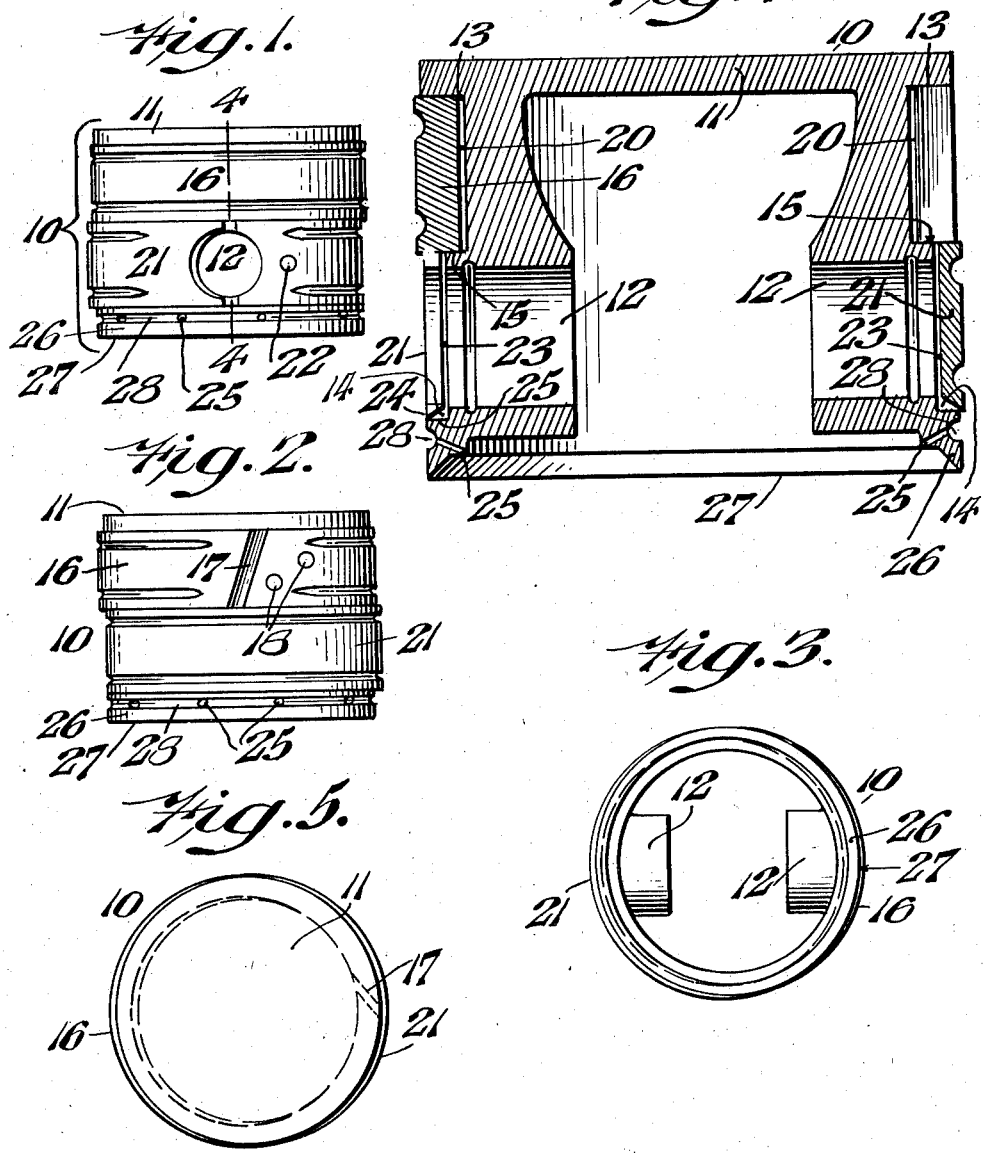
INVENTOR
OSCAR C. PILLAR.
BY
Robert M. Barr
ATTORNEY July 14, 1942.  O. C. PILLAR  2,289,994
PISTON
Filed Oct. 22, 1941  2 Sheets-Sheet 2
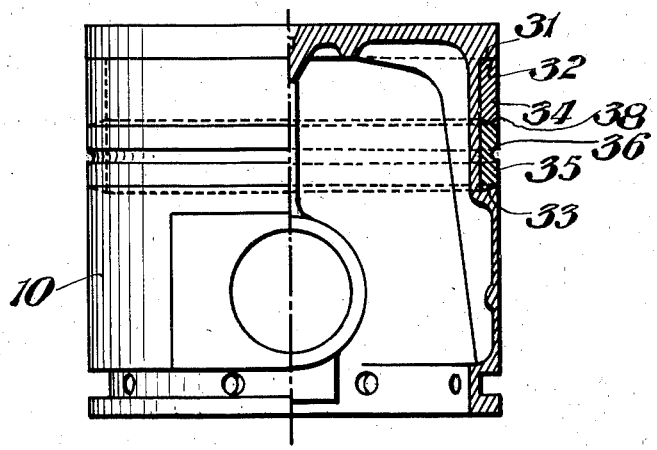
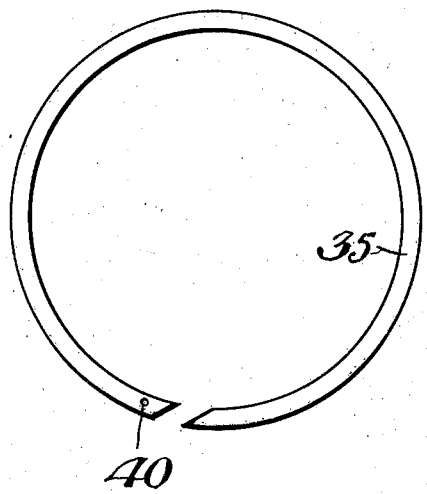
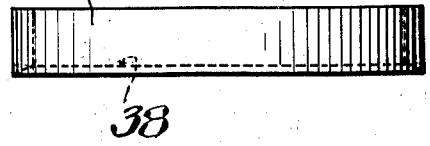
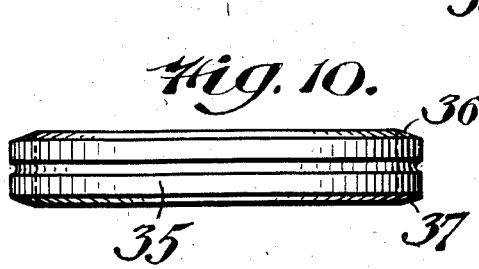
INVENTOR
OSCAR C. PILLAR.
BY Robert M. Barr
ATTORNEY Patented July 14, 1942

2,289,994

UNITED STATES PATENT OFFICE 2,289,994

PISTON

Oscar C. Pillar, Philadelphia, Pa., assignor of one-half to Ringless Piston Corporation, Wilmington, Del., a corporation of Delaware Application October 22, 1941, Serial No. 416,113

8 Claims. (Cl. 309—29)

Some of the objects of the present invention are to provide an improved piston for use in reciprocating engines, pumps, and the like; to provide a piston wherein provision is made for adequate sealing against loss of compression and oil pumping; to provide a piston which eliminates piston slack and slap; to provide a piston which reduces wear to a minimum by distributing the points of wear substantially uniformly about the circumference of the encompassing cylinder; to provide a piston having a plurality of expansible bands so arranged with respect to each other that in action one band compensates for any undesirable action of another; to provide a piston wherein two expansible bands are so associated in position upon the piston body that the major pressure of one is exerted over an area which is not subjected to the major pressure of another band; to provide a piston wherein any points exposed to oil are automatically sealed to prevent leakage; and to provide other improvements as will hereinafter appear.

This application is a refiling of forfeited application Serial No. 157,503, filed August 5, 1937, with additional modification.

In the accompanying drawings Fig. 1 represents an elevation of one side of a piston embodying one form of the present invention; Fig. 2 represents an elevation of the side of the piston opposite to that shown in Fig. 1; Fig. 3 represents a bottom plan; Fig. 4 represents an enlarged section on line 4—4 of Fig. 1; Fig. 5 represents a top plan; Fig. 6 represents a side elevation in part section of a modified form of the invention; Fig. 7 represents a plan of one of the piston bands; Fig. 8 represents a side elevation of one band; Fig. 9 represents a section on line 9—9 of Fig. 8; and Fig. 10 represents a side elevation of the second band.

Referring to the drawings one form of the present invention consists of a piston body 10 of hollow cylindrical construction having a head 11 formed integral therewith as well as the usual diametrically disposed bosses 12 for receiving the customary wrist pins by which the piston is attached to the crank. As here shown the body 10 is provided with two circumferential grooves 13 and 14, the former 13 being parallel to and in close proximity to the head 11, while the latter 14 opens into the former 13. The two grooves 13 and 14 are so dimensioned and located as to form the major portion of the length of the piston body. The groove 13 which is adjacent to the head 11 is preferably of greater depth than the groove 14 and consequently forms a circumferential ledge or land 15 which serves as a support for a resilient metal split band 16 mounted in the groove 13. In finished and assembled condition one end of the band 16 is rigidly fastened to the piston body 10 while the length thereof brings the free end around into spaced juxtaposed relation to the aforesaid fixed end as indicated by the space 17. Normally the band 16 tends to expand eccentric to the piston head 11 but when assembled in a cylinder the space 17 allows the band 16 to contract the required amount. In the present instance the end of the band 16 which is to be fixed is secured by suitable pins or rivets 18, though where the metal used permits it may be secured by welding. In connection with the mounting of the band 16 it should be noted that while its upper and lower edges have a snug fit against the respective parts of the body 10, the rear wall, however, forms a clearance 20 with the body which in operation becomes filled with oil and thus serves to prevent loss due to leakage past the joints.

The groove 14 serves to receive a split band 21 of resilient material, one end being made fast to the body 10 by a pin or rivet 22, or by welding, if found desirable. Since the groove 14 lies in the same plane as the bosses 12 the band 21 is so located that opposed ends meet in coaxial relation to one of the bosses 12. Hence for purpose of wrist pin assembly the aforesaid band ends are substantially semi-circular in contour, being subscribed on a diameter not less than the diameter of the bore of the boss 12. Thus with the band 21 retracted to its maximum, full unrestricted access can be had to one of the bosses 12. In assembled condition the upper face of the band 21 rides against the lower face of the band 16 to form an effective seal between the two bands. The rear face of the band 21 normally leaves a clearance 23 which fills with oil to function in effect as a packing to prevent leakage. The lower face of the band 21 is bevelled to form a relatively sharp exterior circumferential edge 24 which serves as an oil scraper for removing excess oil and directing it downward to find escape through ports 25 traversing the annular flange 26 forming the bottom end of the body 10. In this connection it should be noted that this flange 26 is bevelled to form a relatively sharp, outwardly flared edge 27 which acts in the capacity of an oil scraper. Preferably the ports 25 extend diagonally downward through the flange 26 and have inlets located in a circumferential groove 28 which serves to collect oil in the manner of the customary oil ring used in pistons of ordinary construction.

By reference to Fig. 4 it will be seen that the point of maximum eccentricity of the band 16 is at one side of the piston body 10 while the point of maximum eccentricity of the band 21 is at the opposite side of the piston body 10. That is to say when considered with respect to the axis of the piston the split in one band is angularly disposed with respect to the split in the other band. While a relatively wide range of angular relation is possible with results improved over ordinary ring pistons, the preferred angle is approximately one hundred and eighty degrees. Each band 16 and 21 is preferably provided with oil grooves 30 in the outer circumferential face thereof.

In operation the piston of the present invention, in so far as it relates to wear, pumping, loss of compression, etc., functions quite differently from the ordinary piston equipped with the usual succession of freely movable expansible rings. In such prior constructions the maximum expansion effort of the ring is exerted at approximately two diametrically opposite points so that uneven wear occurs in the cylinder which results in the well known egg shaped cylinder and its inefficient operation. The expansion of the bands of the invention takes place in a new and novel way in that each expands outwardly using the fixed end more or less in the manner of a fulcrum. To express the action in another way it may be said that the expansion takes place circumferentially of the body of the piston quite in the way of a brake band wrapping itself about a drum. Hence wear instead of being concentrated at two distinct points is distributed uniformly about the whole adjacent area of the piston. Having this action in mind for one of the bands it is obvious since the other band has a substantially complemental position that any tendency to wear at one place is completely compensated by a like wear at another place so that the true cylindrical contour of the cylinder is maintained.

It should also be noted since the expansible bands occupy substantially the full length of the piston body the piston is under perfect control throughout its length and whether or not a skirt is provided as a part of the piston there can be no piston slack or slap. In the preferred embodiment of the invention a skirt is not believed to be necessary.

In the form of the invention shown in Figs. 6 to 10 inclusive, the body 10 is provided with a circumferential groove 31, the upper bounding face 32 of which is a plane surface at right angles to the axis of the body 10, and the lower bounding wall 33 of which is a plane surface angularly disposed to the axis of the body 10. This angularity is such as to converge upwardly from its junction with the rear wall of the groove 31 towards the upper face 32. Preferably this angle is about ten degrees to the horizontal.

For sealing purposes, two split bands 34 and 35 are received within the groove 31 in superposed abutting relation, and having a combined width such that the top of ring 34 seats against the face 32 while the bottom of ring 35 seats against the wall 33.

In order that the band 34 can automatically adjust itself to compensate for wear and maintain a leak-proof joint between the faces 31 and 32, the upper face 36 of the band 35 is bevelled outwardly and downwardly while the lower face 37 is bevelled outwardly and upwardly so that together the converging faces become a wedge. Thus, in assembled condition, the face 36 rides against the complemental bevelled face 38 on the bottom of the band 34, and the face 37 rides against the complemental bevelled wall 33 of the groove 31. In this connection it should be noted that the ring 34 is a free ring, that is, it is not fastened to the piston body 10, though the ring 35 is pinned near one end by a pin 40 to the body 10. Thus the ring 35 maintains the wrap around gripping action heretofore described and is freely expandible to act as a wedge by reason of the bevelled engaging faces. Hence as wear develops the ring 35 automatically compensates for it by radial expansion, but leakage is prevented because this relative change only forces the rings more tightly against all joint surfaces.

Having thus described my invention, I claim:

1. A piston consisting of a head, an annular body part including wrist pin bosses and two circumferential grooves, one of said grooves encircling said bosses, split resilient bands located respectively in said grooves, the band in the boss encircling groove having its meeting ends at opposite sides respectively of one of said bosses, and separate means for securing one end of each band to said body part.

2. A piston consisting of a head, an annular body part including wrist pin bosses and two circumferential grooves, one of said grooves encircling said bosses, split resilient bands located respectively in said grooves, the band in the boss encircling groove having its meeting ends at opposite sides respectively of one of said bosses, and separate means for securing one end of each band to said body part, the two securing means being circumferentially out of alinement.

3. A piston consisting of a head, an annular body part including wrist pin bosses and two circumferential grooves, one of said grooves being deeper than the other, split resilient bands located respectively in said grooves and both in assembled condition expanding against the inner face of a cylinder, separate means for securing one end of each band to said body part, and means including an offset ledge to prevent leakage past the joints of said bands with said body.

4. A piston consisting of a head and an annular body part, means for attaching said piston to a connecting rod, said body part having a circumferential groove of a width approximately equal to the length of said body part, one circumferential portion of said groove being deeper than the other portion to form a circumferential ledge between said portions, two split resilient bands fitted respectively into said portions to form a spring urged wall to abut the encircling wall of the piston cylinder with one of said bands riding in contact with the other band and with said ledge to restrict oil leakage, and separate means securing one end of each band to said body part, said body means being arranged at opposite sides of said body part with respect to each other.

5. A piston consisting of a head and an annular body part, said body part having a circumferential groove, two split resilient bands arranged edge to edge and dimensioned to fit snugly within said groove, and means to press one band against the other under radial expansion of said bands, said means, including two outwardly converging bevels, one bevel being between said body part and one ring, and the other bevel being between the two rings, whereby oil leakage between said bands and body part is prevented.

6. A piston consisting of a head and an annular body part, said body part having a circumferential groove, one wall of said groove having a bevelled face, a split band bevelled on one edge complementally to said bevelled face and contacting therewith when said band is assembled in said groove, said band having its opposite edge provided with a bevel, a second split band fitting the remaining space in said groove and having a bevelled face seating on the second bevelled edge of said first band.

7. A piston consisting of a head and an annular body part, said body part having a circumferential groove formed with upper and lower outwardly convergent surfaces, two split rings fitting said groove in mutually edge to edge relation, said edges being complementally bevelled and coacting to cause the expansion of one ring to supplement the expansion of the other ring while simultaneously initiating pressure axially of said piston to seal the ring groove joints.

8. In pistons, a body part having a groove, a split resilient ring in said groove, means to rigidly fasten one end of said ring to said body part for progressive circumferential expansion, and a second ring in said groove coacting with said first ring and free to expand radially throughout its length, said rings having overlapping complementally bevelled surfaces.

OSCAR C. PILLAR.